US012744774B2

(12) United States Patent
Mishra et al.

(10) Patent No.: US 12,744,774 B2
(45) Date of Patent: Sep. 22, 2026

(54) SYSTEM AND METHOD OF AUTHENTICATION ACROSS A DISTRIBUTED RESOURCE NETWORK

(71) Applicant: BANK OF AMERICA CORPORATION, Charlotte, NC (US)

(72) Inventors: Rahul Kumar Mishra, Skillman, NJ (US); Carl Frederick, Lexington, OH (US); Divya Ilango Arun, Concord, NC (US); Ivan Michael Alvarez, Stallings, NC (US); Mohammad Reza Sahranavard, Highland Lakes, NJ (US); Jeanette Wiggins James, Providence, RI (US); Utkarsh Raj, Charlotte, NC (US); Victoria Lozano-Patrick, Allen, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 672 days.

(21) Appl. No.: 17/980,821

(22) Filed: Nov. 4, 2022

(65) Prior Publication Data

US 2024/0154959 A1 May 9, 2024

(51) Int. Cl.
*H04L 9/40* (2022.01)

(52) U.S. Cl.
CPC ................................ *H04L 63/0861* (2013.01)

(58) Field of Classification Search
CPC ................................................... H04L 63/0861
See application file for complete search history.

(56) References Cited

U.S. PATENT DOCUMENTS

| | | | |
|---|---|---|---|
| 7,725,717 | B2 | 5/2010 | Roux |
| 8,739,266 | B2 | 5/2014 | Buer |
| 9,654,468 | B2 | 5/2017 | Buer |
| 10,448,251 | B1 | 10/2019 | Maria |
| 10,547,454 | B2 | 1/2020 | Beaman |
| 10,554,413 | B2 | 2/2020 | Qiu |
| 10,756,885 | B2 | 8/2020 | Li |
| 10,771,459 | B2 | 9/2020 | Kim |
| 10,805,085 | B1 | 10/2020 | Liang |
| 10,805,088 | B2 | 10/2020 | Qiu |
| 10,810,290 | B2 | 10/2020 | Minter |

(Continued)

*Primary Examiner* — Daniel B Potratz
(74) *Attorney, Agent, or Firm* — Moore & Van Allen PLLC; Nicholas C. Russell

(57) ABSTRACT

Systems, computer program products, and methods are described herein for providing authentication across a distributed resource network. The method includes receiving an authentication request associated with a user. The authentication request includes one or more potential physical characteristics. The method also includes identifying a non-fungible token associated with the user. The non-fungible token associated with the user includes one or more stored physical characteristic of the user. The method further includes comparing the one or more potential physical characteristics of the authentication request with the one or more stored physical characteristics of the user. The method still further includes generating an access determination for the authentication request based on the comparison of the one or more potential physical characteristics of the authentication request with the one or more stored physical characteristics of the user.

15 Claims, 8 Drawing Sheets

(56) References Cited

U.S. PATENT DOCUMENTS

| | | | | |
|---|---|---|---|---|
| 11,177,964 | B2 | 11/2021 | McLean | |
| 11,297,064 | B2 | 4/2022 | Bathen | |
| 11,343,311 | B2 | 5/2022 | Parvataneni | |
| 11,356,243 | B2 | 6/2022 | Umemoto | |
| 11,522,849 | B2 | 12/2022 | Honjo | |
| 2015/0278495 | A1* | 10/2015 | Yu | H04L 9/3239 713/186 |
| 2017/0149560 | A1 | 5/2017 | Shah | |
| 2017/0330179 | A1 | 11/2017 | Song | |
| 2020/0145229 | A1 | 5/2020 | Li | |
| 2020/0374138 | A1 | 11/2020 | Honjo | |
| 2021/0357489 | A1 | 11/2021 | Tali et al. | |
| 2023/0100422 | A1* | 3/2023 | Jakobsson | G06F 21/64 705/67 |
| 2023/0122552 | A1* | 4/2023 | Meyers | H04L 9/3228 463/29 |
| 2024/0037530 | A1* | 2/2024 | Sethia | G06Q 20/40145 |
| 2024/0070306 | A1* | 2/2024 | Jurat | G06F 21/6218 |

* cited by examiner

NFT

252 RELATIONSHIP LAYER

252A OWNERSHIP INFORMATION

254 TOKEN LAYER

254A TOKEN IDENTIFICATION NO.

256 METADATA LAYER

256A RESOURCE LOCATION

256B RESOURCE DESCRIPTOR

<descriptor 1>

<descriptor 2>

258 LICENSING LAYER

258A TRANSFERABILITY PARAMETERS

SYSTEM AND METHOD OF AUTHENTICATION ACROSS A DISTRIBUTED RESOURCE NETWORK

TECHNOLOGICAL FIELD

Example embodiments of the present disclosure relate generally to authentication and security and, more particularly, to authentication across a distributed resource network.

BACKGROUND

Distributed resource networks provide security and authentication issues due to data being maintained and accessible to different entities across the network. Current authentication approaches require users to maintain multiple usernames, passwords, and/or the like, without secure ways to access across the networks. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for providing authentication across a distributed resource network. The system includes at least one non-transitory storage device and at least one processing device coupled to the at least one non-transitory storage device. The at least one processing device is configured to receive an authentication request associated with a user. The authentication request comprises one or more potential physical characteristics. The at least one processing device is also configured to identify a non-fungible token associated with the user. The non-fungible token associated with the user includes one or more stored physical characteristic of the user. The at least one processing device is further configured to compare the one or more potential physical characteristics of the authentication request with the one or more stored physical characteristics of the user. The at least one processing device is still further configured to generate an access determination for the authentication request based on the comparison of the one or more potential physical characteristics of the authentication request with the one or more stored physical characteristics of the user.

In various embodiments, the at least one processing device is configured to create the non-fungible token associated with the user with the non-fungible token being created using information provided by the user. In various embodiments, the access determination includes approving the authentication request in an instance in which the one or more potential physical characteristics of the authentication request matches the one or more stored physical characteristics of the user or rejecting the authentication request in an instance in which the one or more potential physical characteristics of the authentication request and the one or more stored physical characteristics of the user are different.

In various embodiments, the one or more stored physical characteristics of the user comprises a plurality of stored physical characteristics, wherein the plurality of stored physical characteristics is associated with an entry sequence. In various embodiments, the comparison of the one or more potential physical characteristics of the authentication request with the one or more stored physical characteristics of the user includes comparing the entry sequence of the plurality of stored physical characteristics with the one or more potential physical characteristics of the authentication request.

In various embodiments, the at least one processing device is configured to receive the non-fungible token associated with the user based on the authentication request. In various embodiments, the non-fungible token is accessible to a plurality of entities across a distributed network.

In another example embodiment, a computer program product for providing authentication across a distributed resource network. The computer program product includes at least one non-transitory computer-readable medium having computer-readable program code portions embodied therein. The computer-readable program code portions include an executable portion configured to receive an authentication request associated with a user. The authentication request comprises one or more potential physical characteristics. The computer-readable program code portions also include an executable portion configured to identify a non-fungible token associated with the user. The non-fungible token associated with the user includes one or more stored physical characteristic of the user. The computer-readable program code portions further include an executable portion configured to compare the one or more potential physical characteristics of the authentication request with the one or more stored physical characteristics of the user. The computer-readable program code portions still further include an executable portion configured to generate an access determination for the authentication request based on the comparison of the one or more potential physical characteristics of the authentication request with the one or more stored physical characteristics of the user.

In various embodiments, the computer program product further includes an executable portion configured to cause create the non-fungible token associated with the user with the non-fungible token being created using information provided by the user. In various embodiments, the access determination includes approving the authentication request in an instance in which the one or more potential physical characteristics of the authentication request matches the one or more stored physical characteristics of the user or rejecting the authentication request in an instance in which the one or more potential physical characteristics of the authentication request and the one or more stored physical characteristics of the user are different.

In various embodiments, the one or more stored physical characteristics of the user includes a plurality of stored physical characteristics, and the plurality of stored physical characteristics is associated with an entry sequence. In various embodiments, the comparison of the one or more potential physical characteristics of the authentication request with the one or more stored physical characteristics of the user includes comparing the entry sequence of the plurality of stored physical characteristics with the one or more potential physical characteristics of the authentication request.

In various embodiments, the computer program product further includes an executable portion configured to receive the non-fungible token associated with the user based on the authentication request. In various embodiments, the non-fungible token is accessible to a plurality of entities across a distributed network.

In still another example embodiment, a computer-implemented method for providing authentication across a distributed resource network. The method includes receiving an authentication request associated with a user. The authentication request includes one or more potential physical characteristics. The method also includes identifying a non-fungible token associated with the user. The non-fungible token associated with the user includes one or more stored physical characteristic of the user. The method further includes comparing the one or more potential physical characteristics of the authentication request with the one or more stored physical characteristics of the user. The method still further includes generating an access determination for the authentication request based on the comparison of the one or more potential physical characteristics of the authentication request with the one or more stored physical characteristics of the user.

In various embodiments, the method includes creating the non-fungible token associated with the user with the non-fungible token being created using information provided by the user. In various embodiments, the access determination includes approving the authentication request in an instance in which the one or more potential physical characteristics of the authentication request matches the one or more stored physical characteristics of the user or rejecting the authentication request in an instance in which the one or more potential physical characteristics of the authentication request and the one or more stored physical characteristics of the user are different.

In various embodiments, the one or more stored physical characteristics of the user includes a plurality of stored physical characteristics, the plurality of stored physical characteristics is associated with an entry sequence, and the comparison of the one or more potential physical characteristics of the authentication request with the one or more stored physical characteristics of the user comprises comparing the entry sequence of the plurality of stored physical characteristics with the one or more potential physical characteristics of the authentication request.

In various embodiments, the method includes receiving the non-fungible token associated with the user based on the authentication request. In various embodiments, the non-fungible token is accessible to a plurality of entities across a distributed network.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
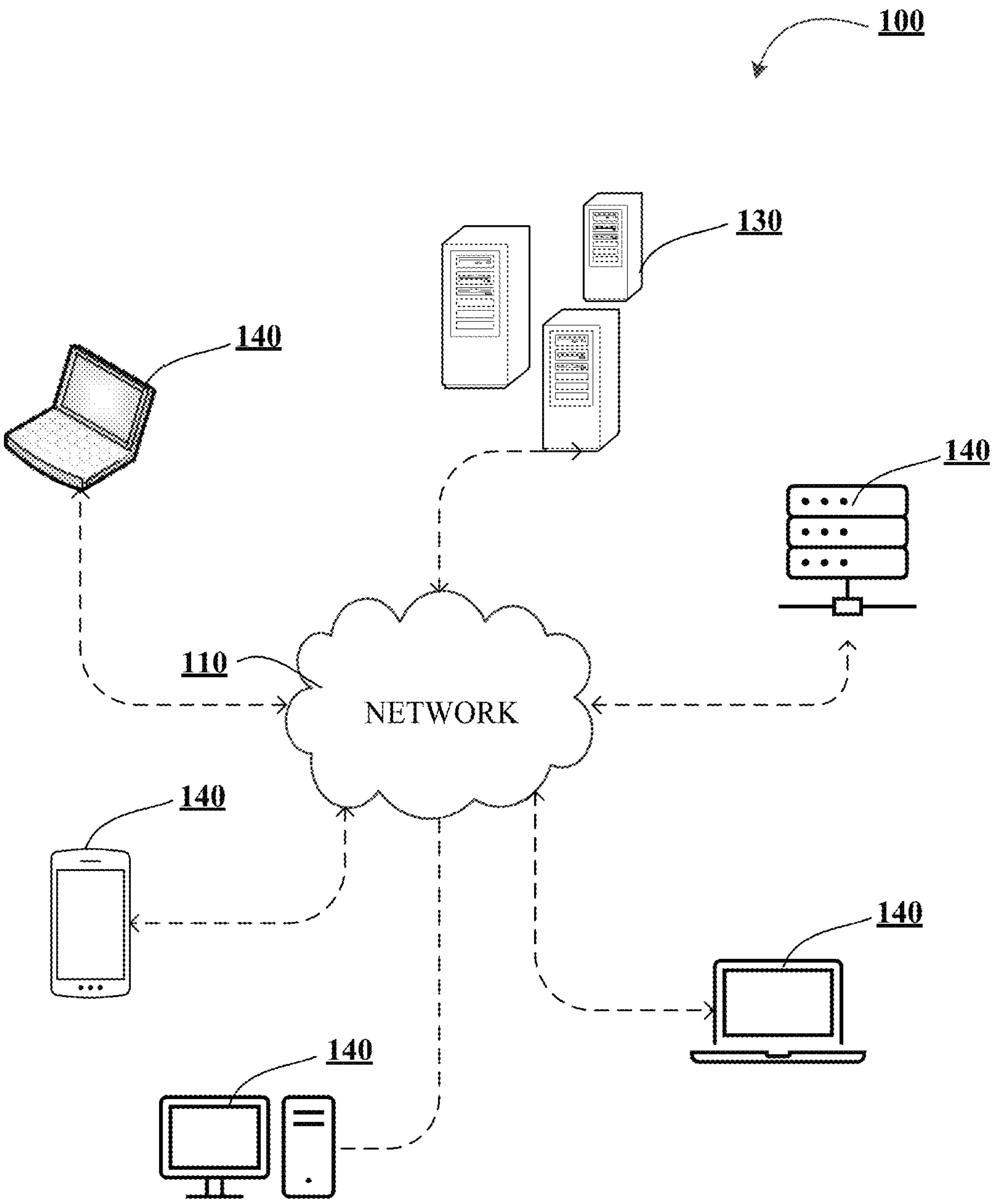
FIGS. 1A-1C illustrates technical components of an exemplary distributed computing environment for providing authentication across a distributed resource network, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, user information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "non-fungible token" (referred to herein as an "NFT" or "token") is a cryptographic record linked to a resource. An NFT is typically stored on a distributed ledger that certifies ownership and authenticity of the resource, and exchangeable in a peer-to-peer network.

Managing credentials across websites has become more difficult as more entities have expanded into having online platforms. As a result, password and credit card number hacking has increased since an individual user can have personal information stored across different entity controlled nodes in a distributed network. Different entities may have different levels of security and one hack can result in user information to be accessed without authorization. Additionally, having different username and password requirements across different entity controlled nodes results in a user often having many slightly different login credentials across sites that makes remembering the specific credentials for each site difficult.

Various embodiments of the present disclosure provide authentication across a distributed resource network. The system creates an NFT with one or more physical characteristic associated with a user. The NFT can then be shared across multiple different entity controlled nodes to provide a secure, unified login credential. The NFT is a digital representation of the physical characteristic(s) associated with the user. The NFT can be shared across the distributed network, such that one or more entities can access the NFT and compare the physical characteristic(s) stored as an NFT to physical characteristic(s) provided by a device associated with the user. As such, users can be securely authenticated without requiring unique authentication across different entity controlled nodes.

The present disclosure provides various technical solutions to technical problems. For example, the present disclosure provides a solution to issues with authentication issues across a distributed network. Namely, the singular NFT being used across different entity controlled nodes of a distributed network allows for improved authentication speed without any reduction in authentication security. Additionally, the present disclosure improves network security as personal data is not required to be stored locally by individual nodes of the distributed network, which reduces the potential of unauthorized access due to hacks of individual nodes. For example, a company that has an individual node on the distributed network may be the target of a hack and in current systems may store personal data locally; however, various embodiments of the present disclosure allow for the personal data (e.g., physical characteristic(s) of the user) to not be stored on the individual node controlled by said company and therefore would not be available to a hacker of the individual node.

Figure 1B:
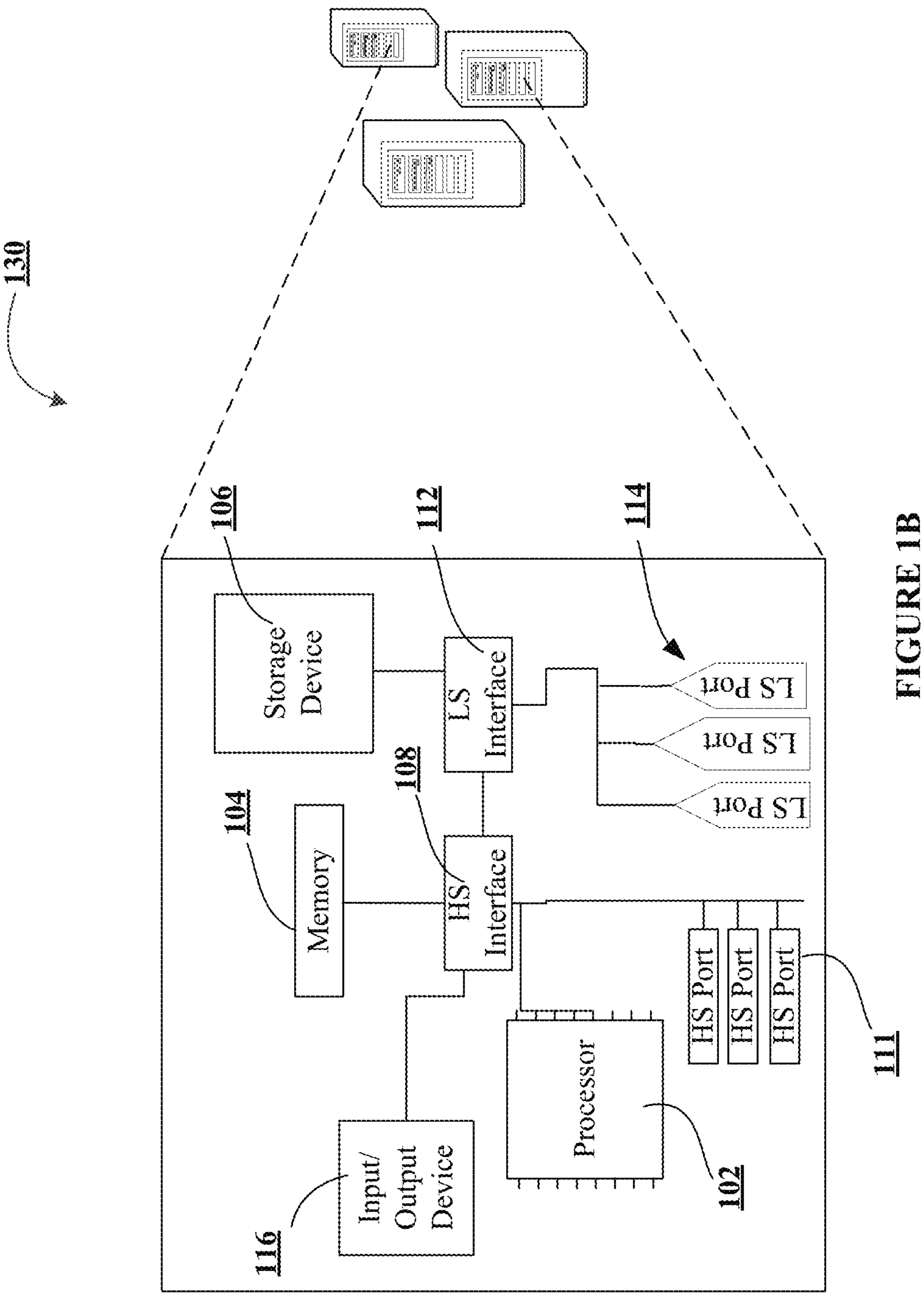
Figure 1C:
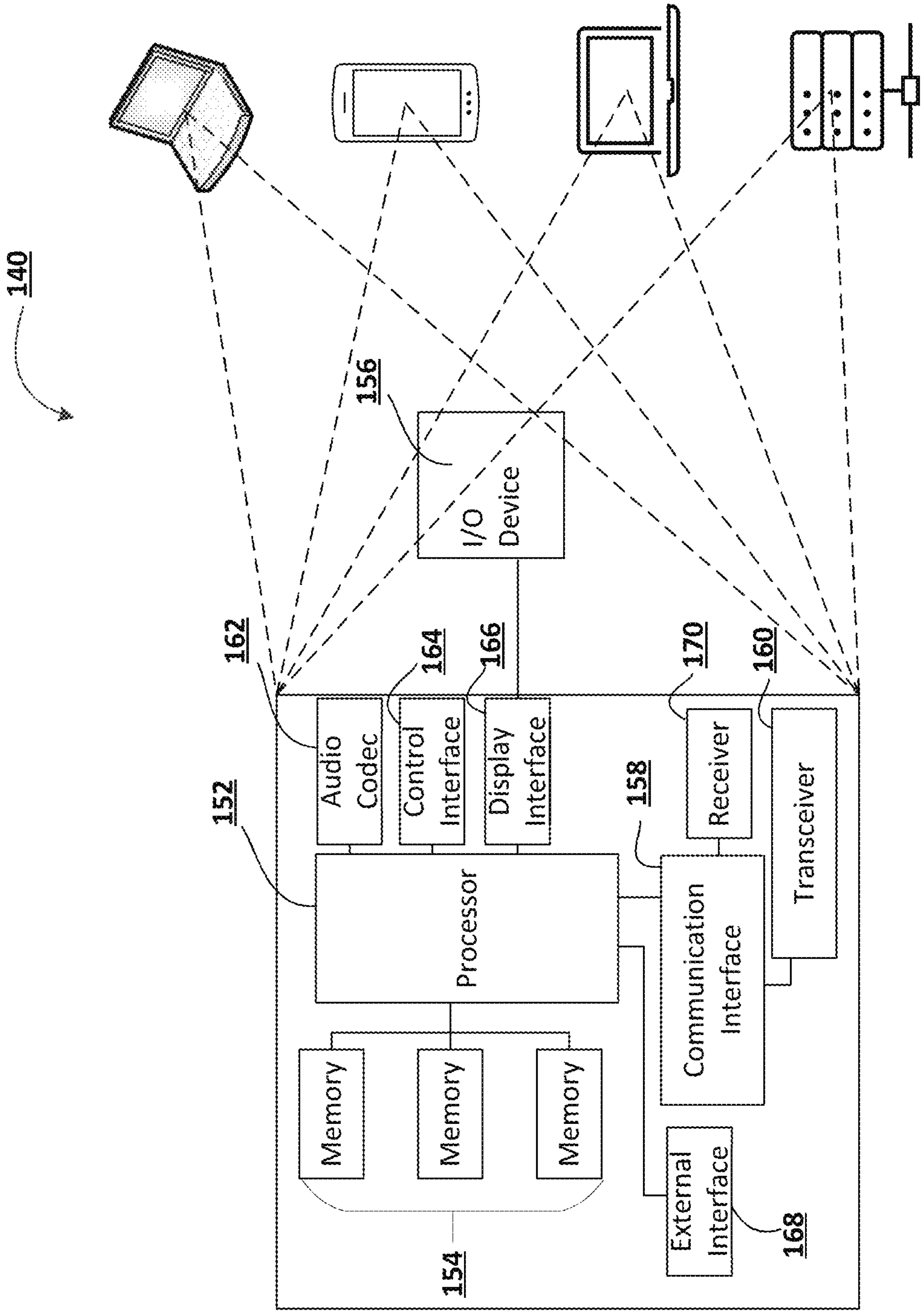

FIGS. 1A-1C illustrate technical components of an exemplary distributed computing environment for providing authentication across a distributed resource network, in accordance with an embodiment of the disclosure. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2A:
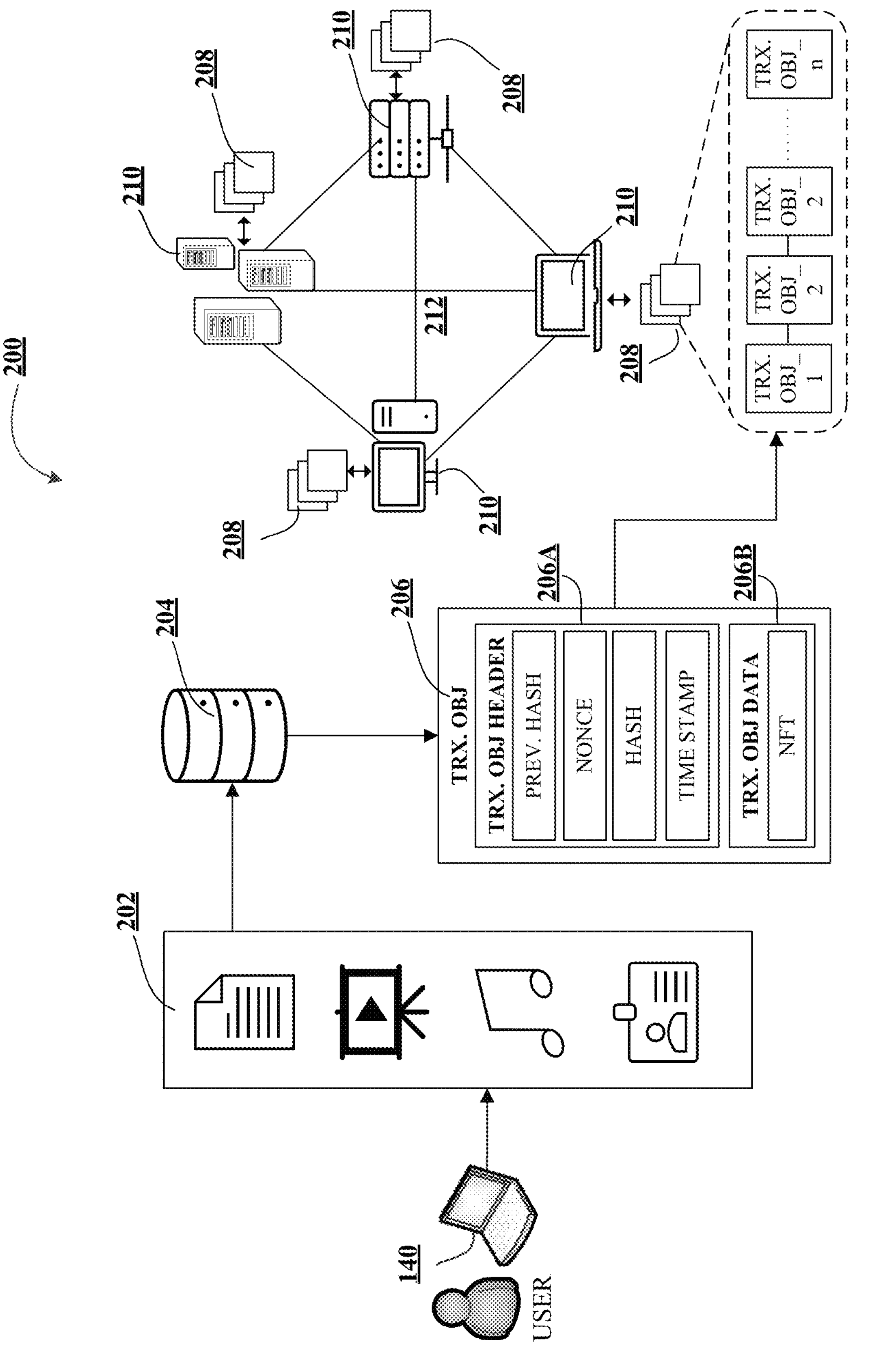
FIG. 2A illustrates an exemplary process of creating an non-fungible token ("NFT"), in accordance with various embodiments of the present disclosure.

FIG. 2A illustrates an exemplary process of creating an NFT 200, in accordance with various embodiments of the present disclosure. As shown in FIG. 2A, to create or "mint" an NFT, a user may identify, using an end-point device 140, resources 202 that the user wishes to mint as an NFT. Typically, NFTs are minted from digital objects that represent both tangible and intangible objects. These resources 202 may include physical characteristics, such as fingerprints, facial imaging, signature, and/or the like. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process.

As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

Figure 2B:
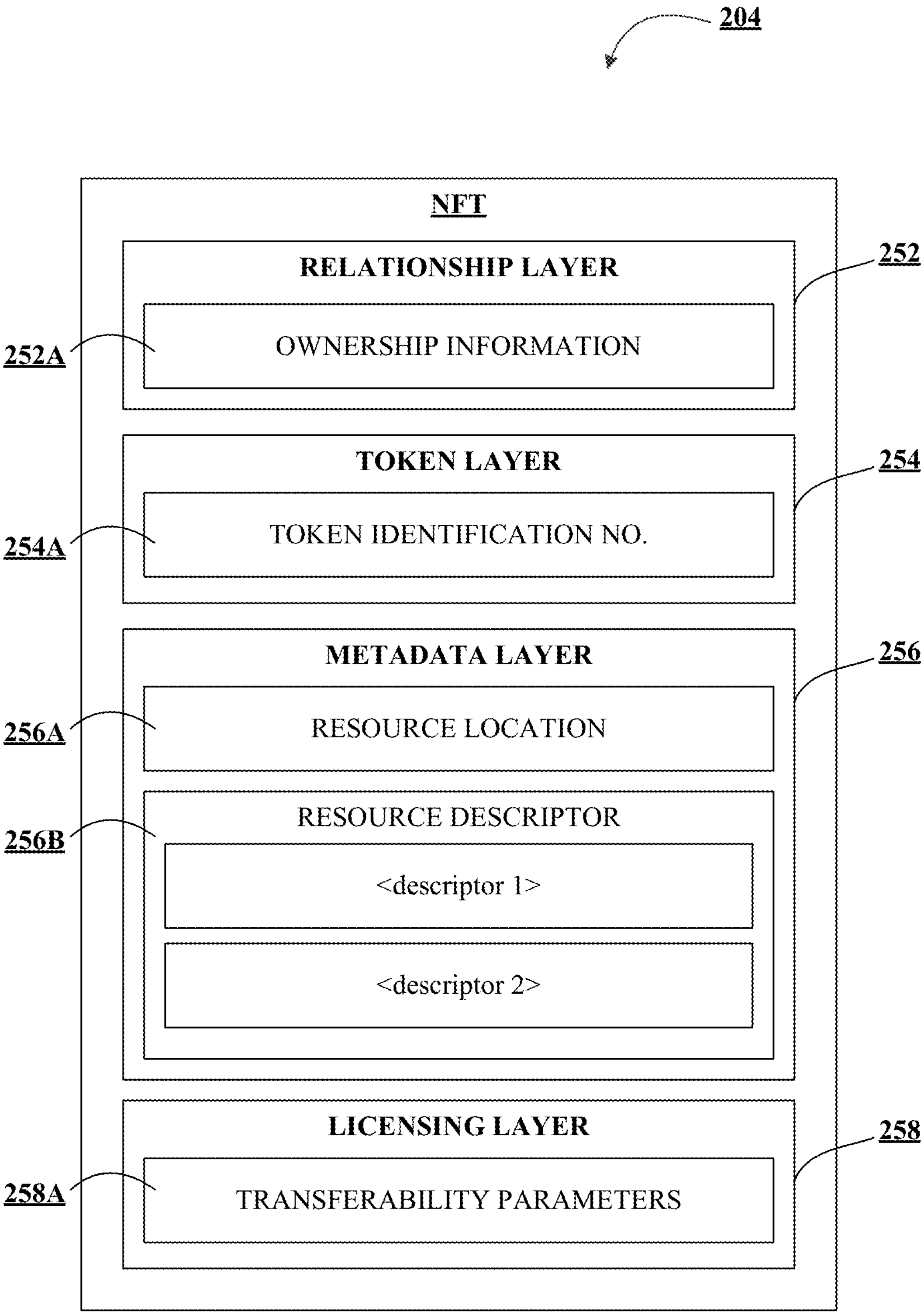
FIG. 2B illustrates an example NFT as a multi-layered documentation of a resource, in accordance with various embodiments of the present disclosure.

FIG. 2B illustrates an exemplary NFT 204 as a multi-layered documentation of a resource, in accordance with various embodiments of the present disclosure. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, an entity may own the non-transferrable NFT minted as discussed herein and entities (e.g., a third party entity with a node on the distributed network that is using the authentication methods discussed herein) that access, copy, etc. the NFT are logged creating a relationship that is stored in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the source itself 202. For example, the file descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the disclosure.

Figure 3A:
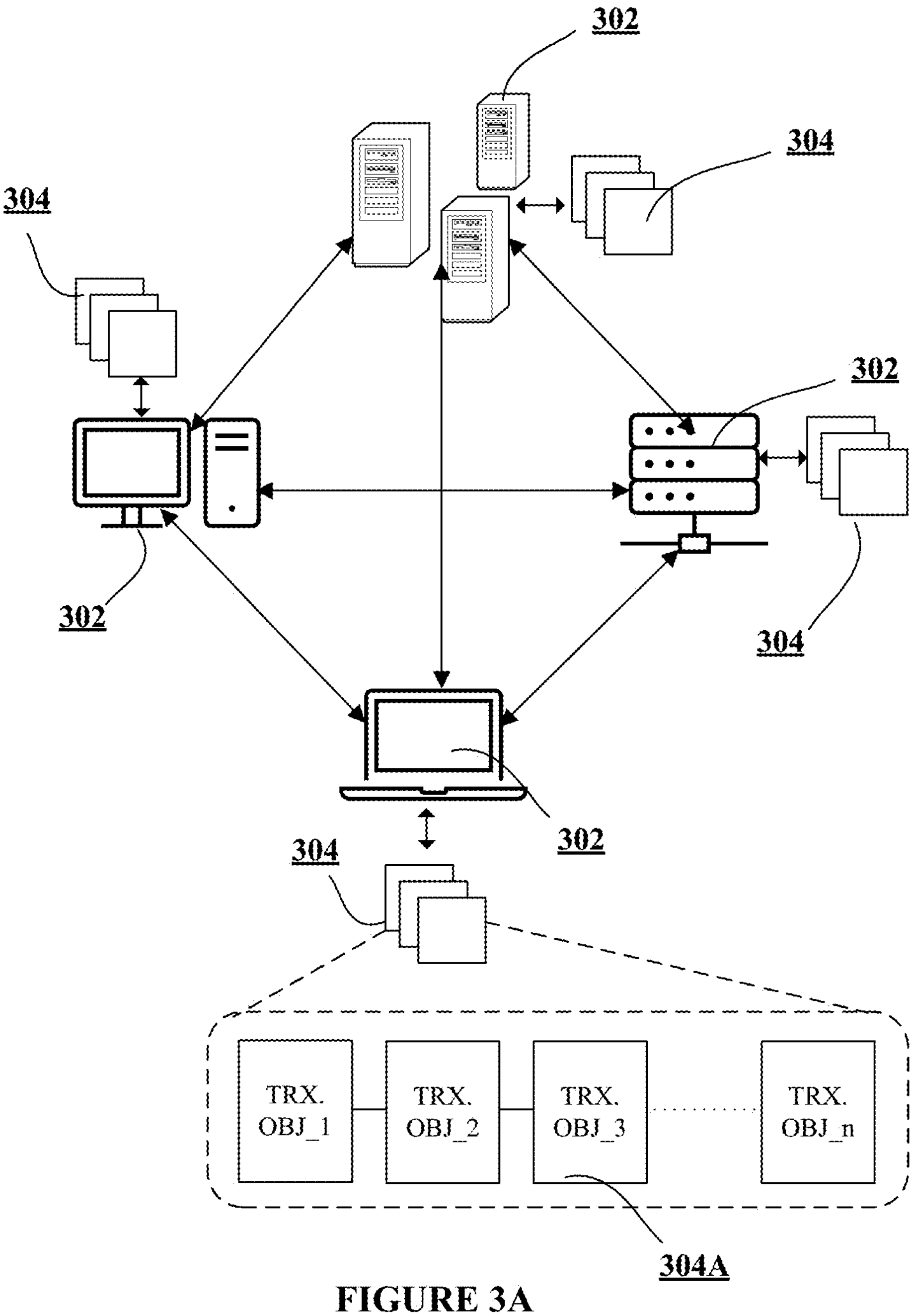
FIGS. 3A-3B illustrate an exemplary distributed ledger technology (DLT) architecture, in accordance with various embodiments of the present disclosure.
Figure 3B:
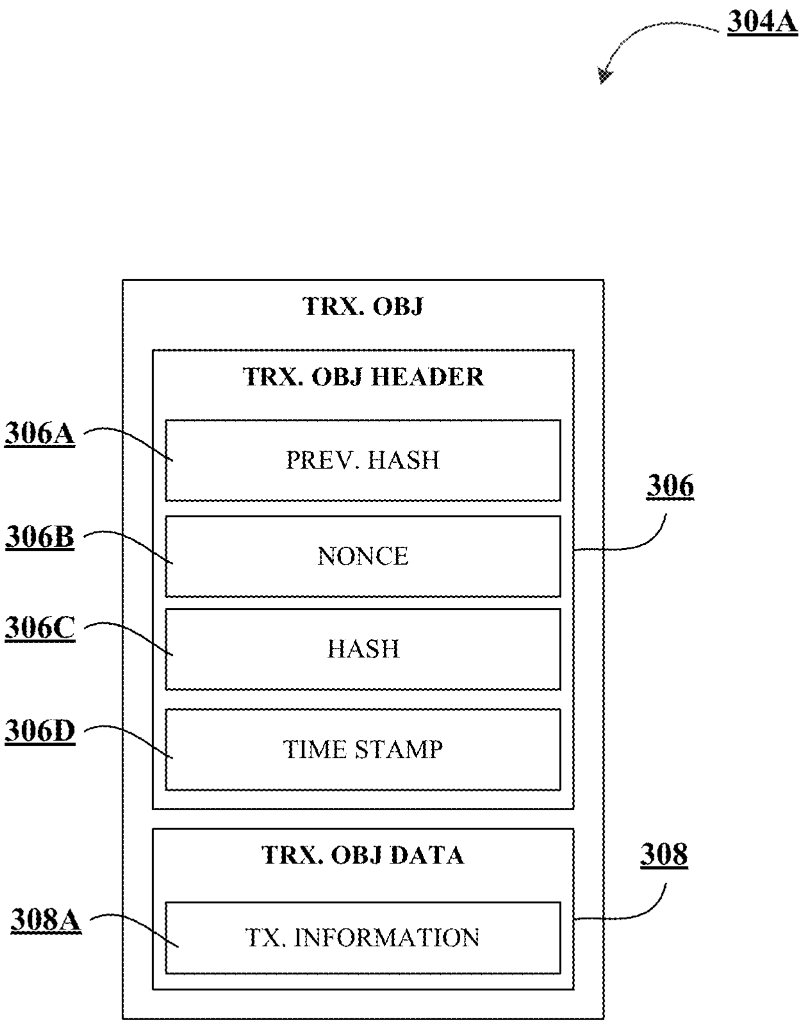

FIGS. 3A-3B illustrate an exemplary distributed ledger technology (DLT) architecture, in accordance with various embodiments of the present disclosure. The example DLT shown in FIGS. 3A-3B may be used in connection with the NFT technology discussed in reference to FIGS. 2A-2B. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried, as well as generally allowing information to be accessed) out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (e.g., 15 member institutions), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 3A, the exemplary DLT architecture 300 includes a distributed ledger 304 being maintained on multiple devices (nodes) 302 that are authorized to keep track of the distributed ledger 304. For example, these nodes 302 may be computing devices such as system 130 and end-point device(s) 140. One node 302 in the DLT architecture 300 may have a complete or partial copy of the entire distributed ledger 304 or set of transactions and/or transaction objects 304A on the distributed ledger 304. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 3B, an exemplary transaction object 304A may include a transaction header 306 and a transaction object data 308. The transaction header 306 may include a cryptographic hash of the previous transaction object 306A, a nonce 306B—a randomly generated 32-bit whole number when the transaction object is created, cryptographic hash of the current transaction object 306C wedded to the nonce 306B, and a time stamp 306D. The transaction object data 308 may include transaction information 308A being recorded. Once the transaction object 304A is generated, the transaction information 308A is considered signed and forever tied to its nonce 306B and hash 306C. Once generated, the transaction object 304A is then deployed on the distributed ledger 304. At this time, a distributed ledger address is generated for the transaction object 304A, i.e., an indication of where it is located on the distributed ledger 304 and captured for recording purposes. Once deployed, the transaction information 308A is considered recorded in the distributed ledger 304.

Figure 4:
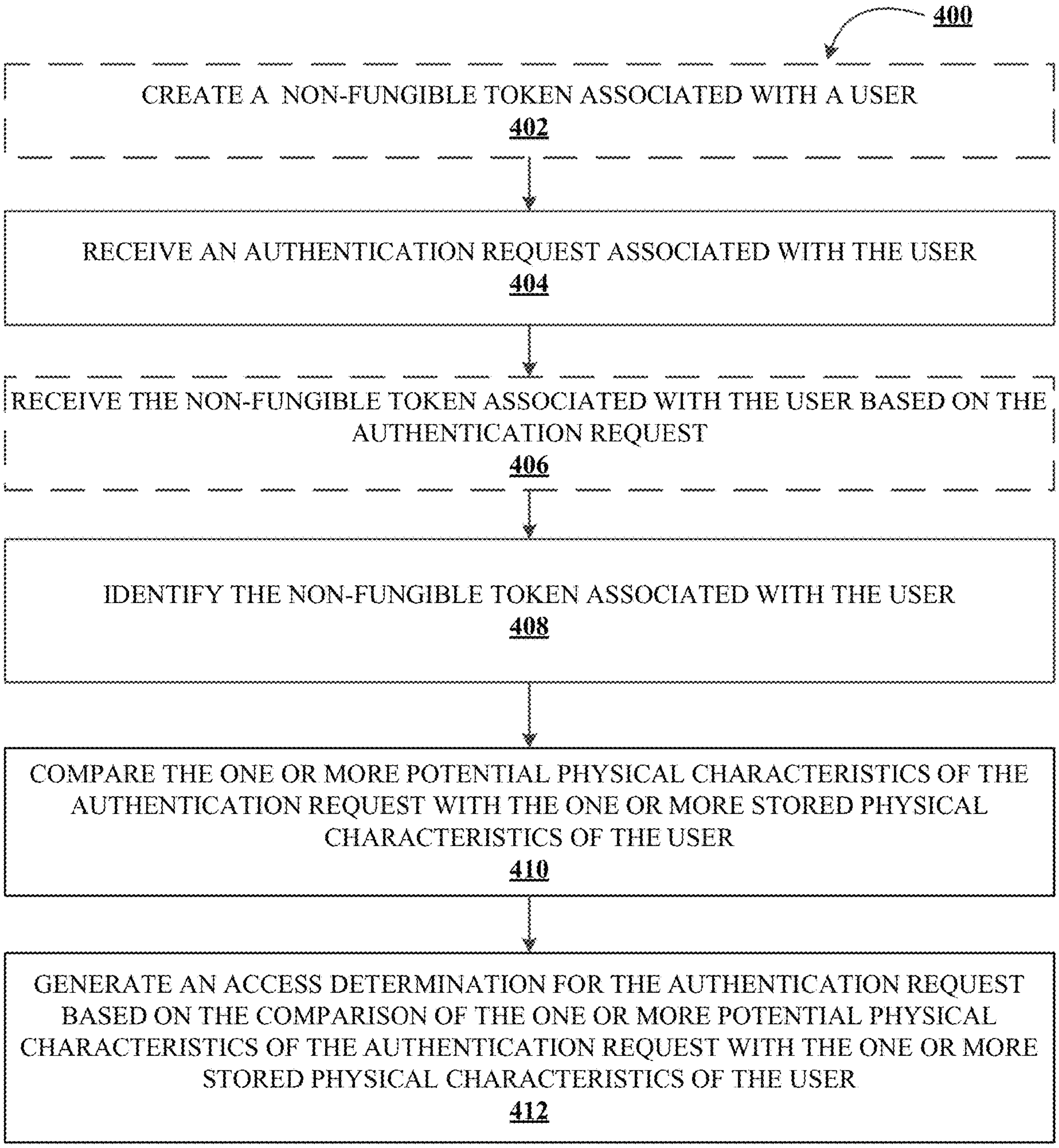
FIG. 4 illustrates a process flow for providing authentication across a distributed resource network, in accordance with various embodiments of the present disclosure.

FIG. 4 is a flow chart 400 that illustrates another example method of providing authentication across a distributed resource network. The method may be carried out by various components of the distributed computing environment 100 discussed herein (e.g., the system 130, one or more endpoint devices 140, etc.). An example system may include at least one non-transitory storage device and at least one processing device coupled to the at least one non-transitory storage device. In such an embodiment, the at least one processing device is configured to carry out the method discussed herein.

Referring now to optional Block 402 of FIG. 4, the method includes creating a non-fungible token associated with a user. The NFT is created using information provided by the user. The NFT may be created as discussed in reference to FIG. 2 above (e.g., a user) may identify, using an end-point device 140, resources 202 that the user wishes to mint as an NFT. The resources used to mint may be physical characteristics of the user. Example physical characteristics include, but are not limited to, fingerprints, facial scan, voice recording, iris scan, finger vein patterning, and/or the like. The physical characteristics may be one or more physical identifiers for the user.

The physical characteristics may be provided by the user via one or more sensors located on an end-point device 140 associated with the user. For example, a user may provide a fingerprint scan via a fingerprint scanner on an end-point device 140 (e.g., a mobile device). Additionally or alternatively, the user may provide physical characteristics via other methods (e.g., the user may upload one or more physical characteristics via an online portal).

The user may have an initial on-boarding process in which the user is requested to provide one or more physical characteristics to be used to create the NFT. In some instances, the user may select the one or more physical characteristics to provide. Alternatively, the user may be prompted to provide one or more specific physical characteristics. In some instances, the user may be able to opt out of providing one or more physical characteristics. In such an instance, an NFT associated with the user is not created and other authentication processes may be used. During the on-boarding process, the user may be authenticated using other authentication means (e.g., two factor authentication, manual verification such as the user providing the physical characteristics at an entity location, and/or the like). As such, the user providing the physical characteristics is independently verified to be the user that is then associated with the NFT. Upon minting, the physical characteristic(s) become the stored physical characteristic(s) discussed herein.

In some embodiments, the NFT associated with the user may have an entry sequence for each of the one or more physical characteristics. The entry sequence defines each of the one or more physical characteristics an entry position based on the order of input by the user. The entry sequence may be indicated by the user (e.g., the order in which the user provides each physical characteristic) or by the system (e.g., the system may request a user provide the physical characteristics in a specific order).

Referring now to Block 404 of FIG. 4, the method includes receiving an authentication request associated with the user. The authentication request may include a request for access to account or data associated with the user. The authentication request may be a part of the login process for a user with a third party entity (e.g., the authentication request may be a part of a user logging into an account associated with the user on a website). The authentication request may include one or more potential physical characteristics to be used to authenticate the user. The one or more potential physical characteristics provided are purported to be the physical characteristic(s) of the user associated with the authentication request (e.g., the user that is attempting to log into an account associated with the user). Each of the one or more potential physical characteristics are physical characteristics that are to be verified using the NFT associated with the user (as discussed in reference to Block 410).

The authentication request may also include other information relating to the process being attempted (e.g., information relating to the access or data attempting to be accessed). For example, the authentication request may be a part of an attempted transaction and include information relating to said transaction. Other user identifying information may also be provided by the authentication request (e.g., an identifier that can be used to identify the NFT associated with the user). For example, the authentication request may include the token identification number of the NFT associated with the user.

Referring now to optional Block 406 of FIG. 4, the method includes receiving the non-fungible token associated with the user based on the authentication request. In some embodiments, receiving the NFT associated with the user may include receiving access to the information stored on the NFT, instructions on location, how to access the information stored on the NFT, and/or the like. As discussed above, a user may have an NFT created that includes one or more stored physical characteristic of the user. The NFT may be stored on a private distributed ledger in which access is controlled by an entity. In such an instance, the controlling entity may provide access to the private distributed ledger to other trusted entities to use the NFTs in the distributed ledger for authentication. For example, a third party website may receive access from the controlling entity to the NFT associated with the user to use the stored physical characteristic(s) stored on the NFT for authentication.

In various embodiments, the NFT may include a plurality of stored physical characteristics. In such an instance the plurality of stored physical characteristics is associated with an entry sequence. Alternatively, the plurality of stored physical characteristics may not have an entry sequence and are merely all stored on the NFT without any indication of order of entry.

Referring now to Block 408 of FIG. 4, the method includes identifying the non-fungible token associated with the user. The non-fungible token is accessible to a plurality of entities across a distributed network. The authentication request may include one or more identifiers to determine the NFT associated with the user. For example, the authentication may include a user identifier (e.g., full name, pass code, email address, phone number, username, NFT identifier such as the token identification number, and/or the like) that can be used to associate the user associated with the authentication request to the NFT associated with the user. The distributed ledger with the NFTs may be searched based on said user identifiers to allow the entity authenticating the user to identify the NFT associated with the user.

The identification of the NFT associated with the user may include retrieval of the NFT from the distributed ledger. In some embodiments, a copy of the NFT may be locally storable by an entity such that once an NFT associated with the user is received from the distributed ledger, the entity may store the copied NFT for future authentication (e.g., the copied NFT may be used for repeat logins of the user).

Referring now to Block 410 of FIG. 4, the method includes comparing the one or more potential physical characteristics of the authentication request with the one or more stored physical characteristics of the user. The comparison of the one or more potential physical characteristics of the authentication request with the one or more stored physical characteristics of the user may determine whether the potential physical characteristics of the authentication request matches the stored physical characteristics of the NFT associated with the user.

In various embodiments, the system may generate a confidence interval to determine whether the one or more potential physical characteristics of the authentication request matches the one or more stored physical characteristics of the user. The confidence interval may be based on similarities between the given potential physical characteristic and the given stored physical characteristic. In an instance in which a plurality of potential physical characteristics is received, the confidence interval may be based on a combination of individual confidence interval for each type of physical characteristic (e.g., a confidence interval based on the similarities between a potential physical characteristics that is a fingerprint and a stored physical characteristics that is a fingerprint, a confidence interval based on the similarities between a potential physical characteristics that is a facial scan and a stored physical characteristics that is a facial scan, etc.).

The comparison of the one or more potential physical characteristics of the authentication request with the one or more stored physical characteristics of the user may be a one to one comparison of each type of physical characteristics. For example, a potential physical characteristic that is a fingerprint is compared to the stored physical characteristic that is a fingerprint and a potential physical characteristic that is a facial scan is compared to the stored physical characteristic that is a facial scan.

Additionally or alternatively, the comparison of the one or more potential physical characteristics of the authentication request with the one or more stored physical characteristics of the user may be based on the entry sequence of the physical characteristics. As discussed above, each of the stored physical characteristics may be associated with an entry order value (e.g., compared to the other stored physical characteristic) and said entry order value may be compared to the entry order value of the potential physical characteristics to determine whether the entry sequence of the potential physical characteristic(s) of the authentication request is the same as the entry sequence of the stored physical characteristic(s) of the NFT. For example, the stored physical characteristics may be in the order of fingerprint, facial scan, and iris scan, while the potential physical characteristics may be provided in the order of facial scan, iris scan, and fingerprint, indicating potential malfeasance (e.g., the authentication request may not be submitted by the user). In some embodiments, both the entry sequence of the potential physical characteristic and the stored physical characteristic are compared, as well as the comparison of the same type of physical characteristic (e.g., fingerprint to fingerprint, facial scan to facial scan, etc.).

Referring now to Block 412 of FIG. 4, the method includes generating an access determination for the authentication request based on the comparison of the one or more potential physical characteristics of the authentication request with the one or more stored physical characteristics of the user. In various embodiments, the access determination is based on the similarities between the one or more potential physical characteristics of the authentication request and the one or more stored physical characteristics of the user.

The access determination may be to approve the authentication request in an instance in which the one or more potential physical characteristics of the authentication request matches the one or more stored physical characteristics of the user. In an instance in which the one or more potential physical characteristics of the authentication request and the one or more stored physical characteristics of the user are different, the authentication request may be rejected. In such an instance, the further security measures may be taken, such as locking the user account, requiring upgraded authentication in subsequent login attempts, and/or other security protocols.

In some embodiments, additional authentication may be requested in an instance in which it is inconclusive whether the one or more potential physical characteristics of the authentication request matches the one or more stored physical characteristics of the user. Additional authentication may include asking for reentry of the potential physical characteristics (e.g., requesting the user rescan the given physical characteristic) or other authentication processes.

The system may determine whether the one or more potential physical characteristics of the authentication request matches the one or more stored physical characteristics of the user based on the confidence interval of the comparison of the one or more potential physical characteristics of the authentication request and the one or more stored physical characteristics of the user. In various embodiments, the system may have a matching threshold value for the confidence interval, which in an instance in which the confidence interval is above the threshold value, the one or more potential physical characteristics of the authentication request and the one or more stored physical characteristics of the user are deemed to be matching. Additionally, the system may have a non-matching threshold value for the confidence interval, which in an instance in which the confidence interval is below the threshold value, the one or more potential physical characteristics of the authentication request and the one or more stored physical characteristics of the user are deemed to be different.

The matching threshold value and the non-matching threshold value are determined based on the level of security desired. For example, the higher the matching threshold value, the higher the likelihood that the authentication request was made by the user associated with the authentication request. Some entities may have higher security levels than others (e.g., some entities may have more stringent legal requirements for access than other entities).

In some instances, the matching threshold value and the non-matching threshold value may be the same. For example, any confidence interval value at or above the threshold value is deemed to be matching (e.g., allowing for the authentication request to be approved) and any confidence interval value below the threshold value to be different (e.g., causing the authentication request to be rejected).

In some instances, the matching threshold value and the non-matching threshold may be different (e.g., the matching threshold is higher than the non-matching threshold). In such an embodiment, in an instance in which the confidence interval value is between the matching threshold value and the non-matching threshold, the potential physical characteristics and the stored physical characteristics are deemed to be inconclusive (e.g., which may require additional authentication).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing authentication across a distributed resource network, the system comprising:

at least one non-transitory storage device; and at least one processing device coupled to the at least one non-transitory storage device, wherein the at least one processing device is configured to:

receive an authentication request associated with a user, wherein the authentication request comprises one or more potential physical characteristics and wherein the authentication request is associated with a first entity;

identify a non-fungible token associated with the user, wherein the non-fungible token associated with the user comprises one or more stored physical characteristics of the user comprising an entry sequence defining each of the one or more stored physical characteristics at an entry position based on an order of input by the user; wherein the non-fungible token is stored on a private distributed ledger associated with a second entity, wherein storing the non-fungible token on the private distributed ledger further comprises constructing a transaction object associated with the non-fungible token comprising:

constructing a transaction header by generating a nonce object comprising a randomly generated thirty-two bit whole number; and linking a cryptographic hash of the transaction object to the nonce object such that the non-fungible token is permanently linked to the cryptographic hash;

compare the one or more potential physical characteristics of the authentication request with plurality of stored physical characteristics comprising the one or more stored physical characteristics of the user, wherein the comparison of the one or more potential physical characteristics comprises determining a match between an entry order value of the one or more potential physical characteristics and the entry sequence of the one or more stored physical characteristics of the user; and based on the comparison of the one or more potential physical characteristics of the authentication request with the one or more stored physical characteristics of the user, generate an access determination for the authentication request, wherein the access determination is associated with the first entity.

2. The system of claim 1, wherein the at least one processing device is configured to create the non-fungible token associated with the user, wherein the non-fungible token is created using information provided by the user.

3. The system of claim 1, wherein the access determination comprises:

approving the authentication request in an instance in which the one or more potential physical characteristics of the authentication request matches the one or more stored physical characteristics of the user; or rejecting the authentication request in an instance in which the one or more potential physical characteristics of the authentication request and the one or more stored physical characteristics of the user are different, wherein rejecting the authentication request further comprises requesting additional upgraded authentication information from the user.

4. The system of claim 1, wherein the at least one processing device is configured to receive the non-fungible token associated with the user based on the authentication request.

5. The system of claim 1, wherein the non-fungible token is accessible to a plurality of entities across a distributed network, the plurality of entities comprising at least the first entity and the second entity.

6. A computer program product for providing authentication across a distributed resource network, the computer program product comprising at least one non-transitory computer-readable medium having computer-readable program code portions embodied therein, the computer-readable program code portions comprising:

an executable portion configured to receive an authentication request associated with a user, wherein the authentication request comprises one or more potential physical characteristics and wherein the authentication request is associated with a first entity;

an executable portion configured to identify a non-fungible token associated with the user, wherein the non-fungible token associated with the user comprises one or more stored physical characteristics of the user comprising an entry sequence defining each of the one or more stored physical characteristics at an entry position based on an order of input by the user; wherein the non-fungible token is stored on a private distributed ledger associated with a second entity, wherein storing the non-fungible token on the private distributed ledger further comprises constructing a transaction object associated with the non-fungible token comprising:

constructing a transaction header by generating a nonce object comprising a randomly generated thirty-two bit whole number; and linking a cryptographic hash of the transaction object to the nonce object such that the non-fungible token is permanently linked to the cryptographic hash;

an executable portion configured to compare the one or more potential physical characteristics of the authentication request with a plurality of stored physical characteristics comprising the one or more stored physical characteristics of the user, wherein the comparison of the one or more potential physical characteristics comprises determining a match between an entry order value of the one or more potential physical characteristics and the entry sequence of the one or more stored physical characteristics of the user; and an executable portion configured to generate an access determination for the authentication request based on the comparison of the one or more potential physical characteristics of the authentication request with the one or more stored physical characteristics of the user, wherein the access determination is associated with the first entity.

7. The computer program product of claim 6, wherein the computer program product further comprises an executable portion configured to cause create the non-fungible token associated with the user, wherein the non-fungible token is created using information provided by the user.

8. The computer program product of claim 6, wherein the access determination comprises:

approving the authentication request in an instance in which the one or more potential physical characteristics of the authentication request matches the one or more stored physical characteristics of the user; or rejecting the authentication request in an instance in which the one or more potential physical characteristics of the authentication request and the one or more stored physical characteristics of the user are different, wherein rejecting the authentication request further comprises requesting additional upgraded authentication information from the user.

9. The computer program product of claim 6, wherein the computer program product further comprises an executable portion configured to receive the non-fungible token associated with the user based on the authentication request.

10. The computer program product of claim 6, wherein the non-fungible token is accessible to a plurality of entities across a distributed network, the plurality of entities comprising at least the first entity and the second entity.

11. A computer-implemented method for providing authentication across a distributed resource network, the method comprising:

receiving an authentication request associated with a user, wherein the authentication request comprises one or more potential physical characteristics and wherein the authentication request is associated with a first entity;

identifying a non-fungible token associated with the user, wherein the non-fungible token associated with the user comprises one or more stored physical characteristics of the user comprising an entry sequence defining each of the one or more stored physical characteristics at an entry position based on an order of input by the user; wherein the non-fungible token is stored on a private distributed ledger associated with a second entity, wherein storing the non-fungible token on the private distributed ledger further comprises constructing a transaction object associated with the non-fungible token comprising:

constructing a transaction header by generating a nonce object comprising a randomly generated thirty-two bit whole number; and linking a cryptographic hash of the transaction object to the nonce object such that the non-fungible token is permanently linked to the cryptographic hash;

comparing the one or more potential physical characteristics of the authentication request with a plurality of stored physical characteristics comprising the one or more stored physical characteristics of the user, wherein the comparison of the one or more potential physical characteristics comprises determining a match between an entry order value of the one or more potential physical characteristics and the entry sequence of the one or more stored physical characteristics of the user; and based on the comparison of the one or more potential physical characteristics of the authentication request with the one or more stored physical characteristics of the user, generating an access determination for the authentication request, wherein the access determination is associated with the first entity.

12. The method of claim 11, further comprising creating the non-fungible token associated with the user, wherein the non-fungible token is created using information provided by the user.

13. The method of claim 11, wherein the access determination comprises:

approving the authentication request in an instance in which the one or more potential physical characteristics of the authentication request matches the one or more stored physical characteristics of the user; or rejecting the authentication request in an instance in which the one or more potential physical characteristics of the authentication request and the one or more stored physical characteristics of the user are different, wherein rejecting the authentication request further comprises requesting additional upgraded authentication information from the user.

14. The method of claim 11, further comprising receiving the non-fungible token associated with the user based on the authentication request.

15. The method of claim 11, wherein the non-fungible token is accessible to a plurality of entities across a distributed network, the plurality of entities comprising at least the first entity and the second entity.

* * * * *